3,010,969
Patented Nov. 28, 1961

3,010,969
O-PYRAZOLYL O-LOWER ALKYL PHOSPHORAMIDATES AND PHOSPHORAMIDOTHIOATES

Raymond H. Rigterink, Midland, Mich., assignor to The Dow Chemical Company, Midland, Mich., a corporation of Delaware
No Drawing. Filed Jan. 25, 1960, Ser. No. 4,178
6 Claims. (Cl. 260—310)

This invention is directed to the O-pyrazolyl O-lower alkyl phosphoramidates and phosphoramidothioates corresponding to the formula

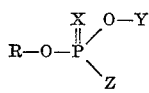

In this and succeeding formulae, Y represents lower alkyl, X represents oxygen or sulfur, Z represents amino or lower alkyl amino, and R represents a 5-pyrazolyl or substituted 5-pyrazolyl radical wherein the substituents are selected from the group consisting of lower alkyl, lower alkenyl and phenyl. The expressions lower alkyl and lower alkenyl are employed in the present specification and claims to refer to alkyl and alkenyl radicals containing from 1 to 5 carbon atoms, inclusive. The new compounds are viscous liquids or crystalline solids which are somewhat soluble in many organic solvents and of very low solubility in water. They have been found to be useful as parasiticides and herbicides and are adapted to be employed as active toxic constituents of compositions for the control of pigweed, millet, mites, insects, nematodes and bacterial and fungal organisms such as ticks, aphids, flies, and beetles. The compounds are also useful as preservatives for paper, paint and wood.

The new compounds may be prepared by several methods. In one method of preparation, an alkali metal salt of a suitable 5-pyrazolol (ROH) is reacted with an O-lower alkyl phosphoramidochloride of the formula

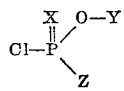

The reaction preferably is carried out in an inert organic solvent as reaction medium such as acetone, benzene, lower alkanols and methyl ethyl ketone. Good results are obtained when employing substantially equimolecular proportions of the reactants. The reaction takes place smoothly at the temperature range of from 0° to 120° C. with the production of the desired product and alkali metal chloride of reaction. In carrying out the reaction, the reactants conveniently are mixed together in the reaction medium and the resulting mixture maintained for a period of time within the contacting temperature range. Upon completion of the reaction, the reaction mixture may be washed with water and the reaction medium removed by fractional distillation under reduced pressure to obtain the desired product as a residue.

In an alternative procedure, the new compounds may be prepared by reacting an alkali metal salt of a 5-pyrazolol (ROH) with an O-lower alkyl phosphorodichloridate having the formula

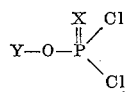

to produce an intermediate O-(5-pyrazolyl) O-lower alkyl phosphorochloridate having the formula

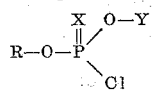

The intermediate is then reacted with ammonia or an alkyl amine to produce the desired product. The reactions are somewhat exothermic and the temperature may be controlled by regulating the rate of contacting the reagents and by external cooling.

In carrying out the first part of the reaction, substantially equimolecular proportions of the phosphorodichloridate reagent and of the alkali metal salt of the pyrazolol reagent are mixed together portionwise at a temperature of from —40° to 50° C. This operation is carried out with stirring and conveniently in the presence of a solvent such as benzene or methyl isobutyl ketone. During the contacting, the reaction takes place smoothly with the formation of the phosphorochloridate intermediate and alkali metal chloride of reaction. Upon completion of the reaction, the reaction mixture may be filtered to separate alkali metal chloride. The filtrate constitutes a solvent solution or dispersion of the desired intermediate. This mixture may be used in the second portion of the reaction or the solvent removed by evaporation or fractional distillation under reduced pressure to obtain the intermediate as a residue.

In the second part of the reaction, two molecular proportions of ammonia or of a lower alkyl amine are added portionwise with stirring to one molecular proportion of the intermediate dissolved in an organic solvent as reaction medium. The addition is carried out with stirring at a temperature of from —20° to 80° C. Upon completion of the reaction, the reaction mixture may be filtered, washed with water, and the washed product fractionally distilled under reduced pressure to remove reaction medium and obtain the desired product as a residue.

The following examples merely illustrate the invention and are not to be construed as limiting.

*Example 1.—O-(3-phenyl-5-pyrazolyl) O-methyl N-isopropyl phosphoramidothioate*

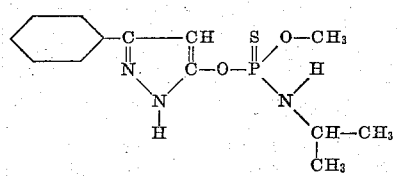

3-phenyl-2-pyrazolin-5-one (16.0 grams; 0.1 mole) and 4.0 grams (0.1 mole) of sodium hydroxide were dispersed in 10 milliliters of water and 250 milliliters of benzene and the resulting mixture heated with stirring at the boiling temperature to produce a benzene suspension of the sodium salt of 3-phenyl-5-pyrazolol. The heating was carried out with the distillation some of the benzene, the aqueous component of the reaction mixture and the water of reaction as formed until no further substantial amounts of water of reaction were evolved. This mixture of 3-phenyl-5-pyrazolol was then successively diluted with 50 milliliters of dimethyl formamide and 18.7 grams (0.1 mole) of O-methyl N-isopropyl phosphoramidochloridothioate and the resulting mixture heated with stirring for 2 hours at a temperature of from 60°–65° C. The reaction mixture was then successively washed with water and the benzene reaction medium removed by fractional distillation under reduced pressure to obtain an O-(3-phenyl-5-pyrazolyl) O-methyl N-isopropyl phosphoramidothioate product as a viscous liquid. This product crystallized upon standing and was successively washed with carbon tetrachloride and aqueous 5 percent sodium hydroxide. The washed product melted at 115°–117° C. and had nitrogen and sulfur contents of 12.95 percent and 9.98 percent, respectively, as compared to theoretical contents of 13.53 percent and 10.3 percent.

*Example 2.—O-(3-methyl-1-phenyl-5-pyrazolyl) O-methyl N-methyl phosphoramidothioate*

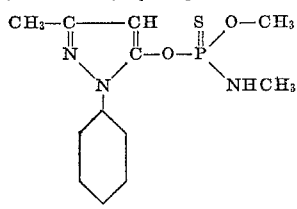

3-methyl-1-phenyl-2-pyrazolin-5-one (17.4 grams; 0.1 mole), 4.0 grams (0.1 mole) of sodium hydroxide and 100 milliliters of ethanol were mixed together and heated at the boiling temperature to prepare an ethanol solution of sodium salt of 3-methyl-1-phenyl-5-pyrazolol. The ethanol solvent was then removed by evaporation and the residue salt added to 16 grams (0.1 mole) of O-methyl N-methyl phosphoramidochloridothioate dispersed in 150 milliliters of benzene. Following the addition, the reaction mixture was heated at the boiling temperature and under reflux for 2.5 hours. The refluxed mixture was then successively washed with water and aqueous 2 percent sodium hydroxide, and the reaction solvent removed from the washed mixture by fractional distillation under reduced pressure to obtain an O-(3-methyl-1-phenyl-5-pyrazolyl) O-methyl N-methyl phosphoramidothioate product as a liquid residue. This product had a refractive index $n/D$ of 1.5748 at 25° C. and a sulfur content of 11.63 percent as compared to a theoretical content of 11.76 percent.

*Example 3.—O-(3,4-dimethyl-5-pyrazolyl) O-methyl N-propyl phosphoramidothioate*

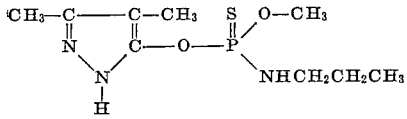

3,4-dimethyl-2-pyrazolin-5-one (11.2 grams; 0.1 mole), 4.0 grams (0.1 mole) of sodium hydroxide, 10 milliliters of water and 250 milliliters of benzene were heated together exactly as described in Example 1 to produce a benzene suspension of the sodium salt of 3,4-dimethyl-5-pyrazolol. This mixture was successively diluted with 50 milliliters of dimethyl formamide and 18.8 grams (0.1 mole) of O-methyl N-propyl phosphoramidochloridothioate and the diluted mixture heated with stirring at a temperature of from 60° to 65° C. for two hours. The mixture was then cooled to room temperature, successively washed with water, and the reaction medium removed by fractional distillation under reduced pressure to obtain an O-(3,4-dimethyl-5-pyrazolyl) O-methyl N-propyl phosphoramidothioate product as a liquid material having a refractive index $n/D$ of 1.5258 at 25° C.

*Example 4.—O-(4-allyl-3-methyl-5-pyrazolyl) O-methyl N-propyl phosphoramidothioate*

4-allyl-3-methyl-2-pyrazolin-5-one (13.8 grams; 0.1 mole), 4.0 grams (0.1 mole) of sodium hydroxide, 10 milliliters of water and 250 milliliters of benzene were heated together as described in Example 1 to produced a benzene solution of the sodium salt of 4-allyl-3-methyl-5-pyrazolol and this solution subsequently diluted with 50 milliliters of dimethyl formamide. The diluted solution was then mixed with 18.8 grams (0.1 mole) of O-methyl N-propyl phosphoramidochloridothioate and the resulting mixture heated with stirring at a temperature of from 60° to 65° C. for two hours. The reaction mixture was then successively washed with water and the washed mixture fractionally distilled under reduced pressure to separate low boiling constituents and obtain an O-(4-allyl-3-methyl-5-pyrazolyl) O-methyl N-propyl phosphoramidothioate product as a residue. This product was a liquid material having a refractive index $n/D$ of 1.5280 at 25° C. and a sulfur content of 11.25 percent as compared to a theoretical content of 11.07 percent.

*Example 5.—O-(3-methyl-5-pyrazolyl) O-ethyl N-propyl phosphoramidate*

3-methyl-2-pyrazolin-5-one (9.8 grams; 0.1 mole), 4.0 grams (0.1 mole) of sodium hydroxide, 10 milliliters of water and 200 milliliters of methyl isobutyl ketone were mixed together and heated as described in Example 1 to produce a dispersion of the sodium salt of 3-methyl-5-pyrazolol. O-ethyl phosphorodichloridate (16.3 grams; 0.1 mole) was added portionwise with stirring and cooling to the above dispersion. The addition was carried out in about 5 minutes and at a temperature of from 25° to 30° C. Stirring was thereafter continued for about 5 minutes to complete the reaction and produce an O-(3-methyl-5-pyrazolyl) O-ethyl phosphorochloridate intermediate. Propyl amine (11.8 grams; 0.2 mole) was added portionwise with stirring and cooling to the above dispersion of the phosphorochloridate intermediate. The addition was carried out at a temperature of from 25° to 30° C. and over a period of about 5 minutes. Following the addition, stirring was continued for about ½ hour and the reaction mixture thereafter filtered and the solvent removed from the filtrate by fractional distillation under reduced pressure. As a result of these operations, there was obtained an O-(3-methyl-5-pyrazolyl) O-ethyl N-propyl phosphoramidate product as a viscous liquid material having a refractive index $n/D$ of 1.4807 at 25° C.

*Example 6.—O-(3-methyl-5-pyrazolyl) O-methyl N-tert.-butyl phosphoramidothioate*

3-methyl-2-pyrazolin-5-one (9.8 grams; 0.1 mole), 5.25 milliliters of aqueous 50 percent sodium hydroxide (0.1 mole of NaOH), 10 milliliters of water and 250 milliliters of benzene were heated together in the manner as described in Example 1 to produce a benzene suspension of the sodium salt of 3-methyl-5-pyrazolol. This suspension was diluted with 50 milliliters of dimethyl formamide and 16.5 grams (0.1 mole) of O-methyl phosphorodichloridothioate added portionwise to the diluted mixture with stirring and cooling. The addition was carried out at a temperature of from 5° to 10° C. and in a period of about 15 minutes. Stirring was thereafter continued for one hour at a temperature of from 0° to 5° C. to complete the reaction and produce an O-(3-methyl-5-pyrazolyl) phosphorochloridothioate intermediate. Tert.-butylamine (14.6 grams; 0.2 mole) was added portionwise with stirring to the above mixture containing the intermediate product. The addition was carried out over a period of 10 minutes and at a temperature of from 2° to 5° C. Following the addition, stirring was continued for one hour as the mixture was allowed to warm to room temperature. The reaction mixture was then successively washed with water and the reaction medium removed from the washed mixture by fractional distillation under reduced pressure. As a result of these operations, there was obtained an O-(3-methyl-5-pyrazolyl) O-methyl N-tert.-butyl phosphoramidothioate product as a liquid material having a refractive index $n/D$ of 1.5361 at 25° C.

*Example 7.—O-(3-methyl-5-pyrazolyl) O-methyl N,N dimethyl phosphoramidothioate*

3-methyl-2-pyrazolin-5-one (9.8 grams; 0.1 mole), 4.0 grams (0.1 mole) of sodium hydroxide, 10 milliliters of water and 250 milliliters of benzene were heated together as previously described to produce a benzene solution of the sodium salt of 3-methyl-5-pyrazolol and the resulting solution diluted with 50 milliliters of dimethyl formamide. 17.4 grams (0.1 mol) of O-methyl N,N-dimethyl phosphoramidochloridothioate was added to the above mixture and the temperature thereafter raised from 60° to 65° C. for two hours to complete the reaction. The reaction mixture was then successively washed with water and the reaction medium removed by fractional distillation under reduced pressure. As a result of these operations, there was obtained an O-(3-methyl-5-pyrazolyl) O-methyl N,N-dimethyl phosphoramidothioate product as a liquid residue having a refractive index $n/D$ of 1.5355 at 25° C. and a sulfur content of 13.2 percent as compared to a theoretical content of 13.18 percent.

In a similar manner, other O-pyrazolyl O-lower alkyl phosphoramidates and phosphoramidothioates may be prepared as follows:

O-(3-methyl-5-pyrazolyl) O-methyl N-methyl phosphoramidothioate ($n/D$ of 1.5491 at 25° C.) by reacting together the sodium salt of 3-methyl-5-pyrazolol and O-methyl N-methyl phosphoramidochloridothioate.

O-(3-methyl-5-pyrazolyl) O-methyl N-propyl phosphoramidothioate ($n/D$ of 1.5288 at 25° C.) by reacting together the sodium salt of 3-methyl-5-pyrazolol and O-methyl N-propyl phosphoramidochloridothioate.

O-(3-methyl-5-pyrazolyl) O-methyl N-isopropyl phosphoramidothioate ($n/D$ of 1.5300 at 25° C.) by reacting together the sodium salt of 3-methyl-5-pyrazolol and O-methyl N-isopropyl phosphoramidochloridothioate.

O-(3-methyl-5-pyrazolyl) O-methyl N-isobutyl phosphoramidothioate ($n/D$ of 1.5270 at 25° C.) by reacting together the sodium salt of 3-methyl-5-pyrazolol and O-methyl N-isobutyl phosphoramidochloridothioate.

O-(3-methyl-5-parazolyl) O-ethyl N-ethyl phosphoramidothioate ($n/D$ of 1.5289 at 25° C.) by reacting together the sodium salt of 3-methyl-5-pyrazolol and O-ethyl N-ethyl phosphoramidochloridothioate.

O-(3-methyl-5-pyrazolyl) O-propyl N-propyl phosphoramidothioate ($n/D$ of 1.5212 at 25° C.) by reacting together the sodium salt of 3-methyl-5-pyrazolol and O-propyl N-propyl phosphoramidochloridothiate.

O-(3-methyl-5-pyrazolyl) O-isopropyl N-isopropyl phosphoramidothiate ($n/D$ of 1.5112 at 25° C.) by reacting the sodium salt of 3-methyl-5-pyrazolol and O-isopropyl N-isopropyl phosphoramidochloridothioate.

O-(3-methyl-5-pyrazolol) O-butyl phosphoramidothioate ($n/D$ of 1.5350 at 25° C.) by reacting together the sodium salt of 3-methyl-5-pyrazolol and O-butyl phosphoramidochloridothioate.

O-(3-methyl-5-pyrazolyl) O-butyl N-butyl phosphoramidothioate ($n/D$ of 1.5107 at 25° C.) by reacting together the sodium salt of 3-methyl-5-pyrazolol and O-butyl N-butyl phosphoramidochloridothioate.

O-(3-methyl-5-pyrazolyl) O-sec.-butyl N-methyl phosphoramidothioate ($n/D$ of 1.5294 at 25° C.) by reacting together the sodium salt of 3-methyl-5-pyrazolol and O-sec.-butyl N-methyl phosphoramidochloridothioate.

O-(3-methyl-5-pyrazolyl) O-isobutyl N-methyl phosphoramidothioate ($n/D$ of 1.5233 at 25° C.) by reacting together the sodium salt of 3-methyl-5-pyrazolol and O-isobutyl N-methyl phosphoramidochloridothioate.

O-(4-phenyl-5-pyrazolyl) O-amyl N,N-diethyl phosphoramidate by reacting together the potassium salt of 4-phenyl-5-pyrazolol and O-amyl N,N-diethyl phosphoramidochloridate.

O-(5-pyrazolyl) O-methyl N,N-diamyl phosphoramidate by reacting together the potassium salt of 5-pyrazolol and O-methyl N,N-diamyl phosphoramidochloridate.

O-(4-amyl-5-pyrazolyl) O-propyl N-butyl phosphoramidothioate by reacting together the sodium salt of 4-amyl-5-pyrazolol and O-propyl N-butyl phosphoramidochloridothioate.

O-(1-methyl-5-pyrazolyl) O-ethyl N-ethyl phosphoramidothioate by reacting O-ethyl phosphorodichloridothioate successively with the sodium salt of 1-methyl-5-pyrazolol and ethyl amine.

O-(1-methallyl-5-pyrazolyl) O-methyl phosphoramidate by reacting together the sodium salt of 1-methallyl-5-pyrazolol and O-methyl phosphoramidochloridate.

O-(3-propenyl-5-pyrazolyl) O-butyl phosphoramidothioate by reacting O-butyl phosphorodichloridothioate successively with the potassium salt of 3-propenyl-5-pyrazolol and ammonia.

O-(1-amyl-5-pyrazolyl) O-butyl phosphoramidate by reacting O-butyl phosphorodichloridate successively with the potassium salt of 1-amyl-5-pyrazolol and ammonia.

O-(1,3-diphenyl-5-pyrazolyl) O-methyl phosphoramidate by reacting together the sodium salt of 1,3-diphenyl-5-pyrazolol and O-methyl phosphoramidochloridate.

O-(1-amyl-5-pyrazolyl) O-methyl N-methyl phosphoramidate by reacting together the sodium salt of 1-amyl-5-pyrazolol and O-methyl N-methyl phosphoramidochloridate.

O-(3-methyl-5-pyrazolyl) O-methyl N-methyl phosphoramidate by reacting together the sodium salt of 3-methyl-5-pyrazolol and O-methyl N-methyl phosphoramidochloridate.

The alkali metal salts of the 5-pyrazolol materials to be employed as starting reagents in accordance with the teachings of the present application may be prepared by reacting an alkali metal hydroxide such as sodium or potassium hydroxide with a suitable 2-pyrazolin-5-one in a solvent such as benzene. The reaction takes place readily at temperatures of from 35° to 100° C. with the production of the desired product and water of reaction. Maximum yields are obtained when the water of reaction is withdrawn from the reaction zone as formed.

The 2-pyrazolin-5-one materials to be employed as intermediates in accordance with the present teachings may be prepared by reacting hydrazine, phenylhydrazine, a lower alkenylhydrazine, or a lower alkylhydrazine with a lower alkyl ester of a suitable acylalkanoic acid such as formylacetic acid, acetoacetic acid, propionylacetic acid, hexanoylacetic acid, 2-formylpropionic acid, 2-formylheptanoic acid, 2-aceto-4-pentenoic acid, 2-(3-butenoyl)-acetic acid, benzoylacetic acid, 2-formylphenylacetic acid and 2-aceto-phenylacetic acid. The reaction is carried out in water as reaction medium and takes place smoothly at temperatures of from 20° to 80° C. with the production of the desired 2-pyrazolin-5-one or substituted 2-pyrazolin-5-one, lower alkanol and water of reaction. Upon completion of the reaction, the desired product may be separated by conventional methods.

The O-lower alkyl phosphorodichloridates and phosphorodichloridothioates employed as starting materials, as described herein, may be prepared by reacting a molecular excess of phosphorous oxychloride ($POCl_3$) or phosphorous thiochloride ($PSCl_3$) with an alkali metal lower alcoholate. Good results are obtained when employing from 2–4 moles of phosphorous oxychloride or phosphorous thiochloride per mole of the alcoholate. The alcoholate, preferably as the sodium salt, is added with stirring to the phosphorous oxychloride or thiochloride reagent and the mixture thereafter warmed for a short period to complete the reaction. The crude mixture may then be filtered and the filtrate fractionally distilled under reduced pressure to obtain the desired product. The O-lower alkyl phosphoramidochloridates and phosphoramidochloridothioates employed as starting materials may be prepared by the reaction at a temperature of from −10° to 50° C. of two molecular proportions of ammonia or of a lower alkyl amine with one molecular proportion of an O-lower alkyl phosphorodichloridothioate in an organic liquid. Upon completion of the reaction, the reaction mixture may be filtered and the desired product separated from the filtrate by conventional procedures.

The new compounds of the present invention have been found to be useful as herbicides and parasiticides for the control of a number of plant mites, insects, nematodes and bacterial and fungal organisms. For such use, the products may be dispersed on a finely divided solid and employed as dusts. Also, such mixtures may be dispersed in water with the aid of a wetting agent and the resulting aqueous suspensions employed as sprays. In other procedures, the products may be employed as constituents of oil-in-water emulsions or water dispersions with or without the addition of wetting, dispersing or emulsifying agents. In representative operations, aqueous compositions containing 25 parts by weight of one of O-(3-methyl-5-pyrazolyl) O-methyl N-methyl phosphoramidothioate and O-(3-methyl-5-pyrazolyl) O-methyl N-isopropyl phosphoramidothioate per million parts by weight of the compositions give 100 percent kills of 2-spotted spider mites.

I claim:

1. The phosphorous compounds corresponding to the formula

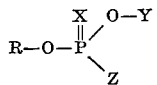

wherein Y represents lower alkyl, X represents a member of the group consisting of oxygen and sulfur, Z represents a member of the group consisting of amino and lower alkyl amino, and R represents a member of the group consisting of the 5-pyrazolyl and substituted 5-pyrazolyl radicals in which said substituents are selected from the group consisting of lower alkyl, lower alkenyl and phenyl.

2. O-(3-methyl-5-pyrazolyl) O-methyl N-methyl phosphoramidothioate.
3. O-(3-methyl-5-pyrazolyl) O-methyl N-isopropyl phosphoramidothioate.
4. O-(3-methyl-5-pyrazolyl) O-methyl N-methyl phosphoramidate.
5. O-(3-methyl-1-phenyl-5-pyrazolyl) O-methyl N-methyl phosphoramidothioate.
6. O-(3-methyl-5-pyrazolyl) O-ethyl N-ethyl phosphoramidothioate.

References Cited in the file of this patent

UNITED STATES PATENTS 2,844,582    Raley _____ July 22, 1958

FOREIGN PATENTS 713,278    Great Britain _____ Aug. 11, 1954
962,612    Germany _____ Apr. 25, 1957

OTHER REFERENCES

Frear et al.: J. of Economic Entomology, vol. 40, pp. 736–41 (1941).